US008768890B2

(12) United States Patent
Burchall et al.

(10) Patent No.: US 8,768,890 B2
(45) Date of Patent: Jul. 1, 2014

(54) DELAYING DATABASE WRITES FOR DATABASE CONSISTENCY

(75) Inventors: Laurion D. Burchall, Seattle, WA (US); Andrew E. Goodsell, Redmond, WA (US); Brett A. Shirley, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 725 days.

(21) Appl. No.: 11/685,871

(22) Filed: Mar. 14, 2007

(65) Prior Publication Data

US 2008/0228834 A1    Sep. 18, 2008

(51) Int. Cl.
*G06F 17/30* (2006.01)

(52) U.S. Cl.
USPC .......................................................... 707/649

(58) Field of Classification Search
USPC ......................................... 707/639, 645, 649
See application file for complete search history.

(56) References Cited

U.S. PATENT DOCUMENTS

| 5,043,866 | A | | 8/1991 | Myre, Jr. et al. ............... 364/200 |
|---|---|---|---|---|
| 5,418,940 | A | * | 5/1995 | Mohan ............................... 714/5 |
| 5,592,660 | A | | 1/1997 | Yokota et al. ................... 395/608 |
| 5,778,388 | A | * | 7/1998 | Kawamura et al. ............ 707/203 |
| 5,845,292 | A | | 12/1998 | Bohannon et al. ............. 707/202 |
| 5,918,229 | A | | 6/1999 | Davis et al. ....................... 707/10 |
| 5,930,794 | A | * | 7/1999 | Linenbach et al. ............ 707/100 |
| 5,968,168 | A | * | 10/1999 | Kato ............................... 712/228 |
| 6,108,671 | A | * | 8/2000 | Ogawa ........................... 707/204 |
| 6,205,449 | B1 | | 3/2001 | Rastogi et al. ................. 707/202 |
| 6,249,520 | B1 | | 6/2001 | Steely, Jr. et al. ............. 370/368 |
| 6,279,027 | B1 | * | 8/2001 | Kato ............................... 718/102 |
| 6,490,594 | B1 | | 12/2002 | Lomet ............................ 707/200 |
| 6,615,223 | B1 | * | 9/2003 | Shih et al. ...................... 707/201 |
| 6,636,851 | B1 | * | 10/2003 | Bamford et al. .................. 707/8 |
| 6,801,938 | B1 | | 10/2004 | Bookman et al. ............. 709/224 |
| 6,980,988 | B1 | * | 12/2005 | Demers et al. .................... 707/8 |
| 7,003,532 | B2 | | 2/2006 | Bradshaw ...................... 707/202 |
| 7,065,540 | B2 | | 6/2006 | Chandrasekaran et al. .. 707/203 |
| 7,328,226 | B1 | * | 2/2008 | Karr et al. ............................. 1/1 |
| 7,330,858 | B1 | * | 2/2008 | Karr et al. ............................. 1/1 |
| 7,353,339 | B2 | * | 4/2008 | Komarla et al. ............... 711/137 |

(Continued)

OTHER PUBLICATIONS

Koo, R. et al., "Checkpointing and Rollback-Recovery for Distributed Systems", *IEEE*, 1986, http://delivery.acm.org, 1150-1158.

(Continued)

*Primary Examiner* — Ajay Bhatia
*Assistant Examiner* — Kurt Mueller
(74) *Attorney, Agent, or Firm* — Louise Bowman; Jim Ross; Micky Minhas

(57) ABSTRACT

A continuous set of committed transactions can be lost without destroying the integrity of the database, by deferring the writing of the database pages stored in cache to the database on stable storage. A waypoint tracks a point in the transaction log following which transactions have not been applied to the database on stable storage and thus records after the waypoint are not needed for recovery to a consistent database. When there is a failover of an active database on Node A to a passive database on Node B, log records are compared starting with the most current and moving backwards and the point at which divergence in the log occurs is determined. When the lost portion of the log occurs after the point indicated by after the waypoint, the database is recoverable by log-based incremental reseed.

20 Claims, 6 Drawing Sheets

(56) References Cited

U.S. PATENT DOCUMENTS

| | | | |
|---|---|---|---|
| 7,539,816 B2* | 5/2009 | Ohsaki et al. | 711/112 |
| 8,402,226 B1* | 3/2013 | Faibish et al. | 711/143 |
| 2002/0152422 A1* | 10/2002 | Sharma et al. | 714/13 |
| 2003/0208511 A1 | 11/2003 | Earl et al. | 707/204 |
| 2003/0217080 A1* | 11/2003 | White et al. | 707/200 |
| 2005/0050110 A1* | 3/2005 | Sawdon et al. | 707/201 |
| 2005/0050112 A1* | 3/2005 | Chandrasekaran | 707/203 |
| 2005/0210073 A1* | 9/2005 | Oeda et al. | 707/200 |
| 2005/0262072 A1* | 11/2005 | Chen et al. | 707/4 |
| 2008/0162590 A1* | 7/2008 | Kundu et al. | 707/202 |

OTHER PUBLICATIONS

Wójcik, Z.M. et al., "Fault Tolerant Distributed Computing Using Atomic Send-Receive Checkpoints", *IEEE*, 1990, http://ieeexplore.org, 215-222.

* cited by examiner

DELAYING DATABASE WRITES FOR DATABASE CONSISTENCY

BACKGROUND

In databases, ACID stands for Atomicity, Consistency (Committed), Isolation, and Durability. These features are considered to be among the key properties required of a database management system, or DBMS, because without them, the integrity of the database cannot be guaranteed. In practice, these properties are often relaxed somewhat to provide better performance. Within the context of database management, a single logical operation on the data of the database is called a transaction. For example, transferring funds from one account to another, even though it consists of multiple individual operations (such as debiting one account and crediting a second account) is a single transaction because if just the debiting is performed, or just the crediting is performed, the database data will be inconsistent.

Atomicity refers to the ability of the DBMS to guarantee that either all of the tasks of a transaction are performed or that none of the tasks are performed. To continue the example above, the transfer of funds can be completed or it can fail, but atomicity guarantees that the first account will not be debited if the second account is not credited and vice versa.

Consistency ensures that the database is in a legal state when a transaction begins and ends. A transaction is not allowed to violate the integrity constraints of the database. For example, if an integrity constraint or rule states that all accounts must have a positive balance, then any transaction that takes the balance to a negative number violates this rule and is aborted. When a transaction is aborted, it is rolled back, that is, a rollback operation undoes all the work performed in the transaction and the database is returned to the consistent state it was in before rollback was performed. A "commit" operation is the opposite of a "rollback". A commit operation generally makes a set of tentative changes permanent. In SQL for example, a transaction begins with a BEGIN statement, includes one or more SQL statements and ends with a COMMIT statement. The COMMIT statement makes the changes made by the transaction visible to other users and releases or updates any checkpoints that were saved. In contrast, the ROLLBACK statement undoes all the work performed since the BEGIN statement was issued.

Isolation refers to the ability of an application to make operations in a transaction appear isolated from all other operations. The isolation property is the most often relaxed ACID property in a DBMS because to maintain the highest level of isolation a DBMS must acquire locks on data, which may result in a loss of concurrency or cause performance problems.

Durability refers to the guarantee that once a user has been notified of success, the transaction will persist, and will not be undone: it will survive system failure, and the database system has checked the integrity constraints and will not abort and roll back the transaction. Typically, all transactions are written into a log that can be played back to recreate the system to a state some time before the failure. A transaction is usually considered "committed" after it has been written to the log, thus when a database is recovered, it is typically recovered back to the last (most recent) committed transaction. This ACID property is occasionally relaxed on databases with "lazy" commit, whereby the committed data may not be immediately written to the transaction log.

Logging in the database context refers to the practice of saving a copy of transactions applied to a database so that in the event that the program or system crashes, the transactions can be reapplied to the database to ensure consistent data. Logging can also be used in the event that the active database is no longer available or has become corrupted, to reapply transactions to a backup copy of the database to return the database to its pre-failure state or to some approximation thereof. Write ahead logging (WAL) refers generally to techniques for providing atomicity and durability in database systems. In a system that uses WAL, all modifications (or compensating undo data) are written to a log before they are applied to the database. WAL allows updates of the database to be done in-place, which is generally considered preferable to the alternative, copy-on-write.

Shadow paging is not in-place updating. A page in the context of shadow paging refers to a unit of physical storage (typically on a hard disk), of the order of 210 to 215 bytes. Shadow paging is a copy-on-write technique that avoids in-place updates of pages. Instead, when a page is to be modified, a shadow page is allocated. Since the shadow page has no references (from other pages on disk), it can be modified without worrying about consistency constraints, etc. When the page is ready to be persisted, all the pages that referred to the original page are updated to refer to the new replacement page instead. Because the replacement page is "activated" only when it is ready, it is atomic. If the pages that referred to the original page are also updated via shadow paging, this procedure may recurse many times, becoming quite costly in terms of performance. Shadow paging is not germane to this discussion.

SUMMARY

A continuous set of committed transactions that have been applied to database pages stored in a database cache in memory can be lost without destroying the integrity (maintaining the Atomic, Isolated, and Consistent portions of ACID-ity) of the database, by deferring the writing of the database pages stored in cache to the database on stable storage. In addition to tracking a checkpoint indicating a point in the log at which a database recovery operation should be initiated, a waypoint tracks a point in the transaction log following which no portion of the transactions have been applied to the database on stable storage. Thus the waypoint represents the last log file or the last log record within a log file that is actually needed for recovery to a consistent database. Further the waypoint represents the last log file or the last log record within a log file that is actually needed before using a log-based incremental reseed as described herein to fix divergence between two nodes in a log shipping based replication system. This is because after the point indicated by the waypoint, no modifications have been written to the database and therefore the databases do not diverge, only the logs diverge. The log-based incremental reseed ensures that the logs that should be kept are kept and the logs that should be discarded are discarded.

When there is a failover of an active database on Node A to a passive database on Node B, the passive database becomes the active database. When all of the records in the transaction log that existed on Node A are not available to Node B, there will be some data lost because the passive database is not completely up to date and cannot be made up to date because of the lost log data. This is called a lossy failover. Log records are compared starting with the most current and moving backwards and the point at which divergence in the log occurs is determined. When the lost portion of the log occurs after the point indicated by the waypoint, log-based incremental reseed is allowed, as described herein. The recovery process is very quick because it involves copying sequential log files rather than randomly accessed database pages but some loss of committed transactions is likely to occur. Thus the durability feature of the database ACID properties is sacrificed in order to simplify and speed up recovery of replication.

DETAILED DESCRIPTION

Overview

Figure 1:
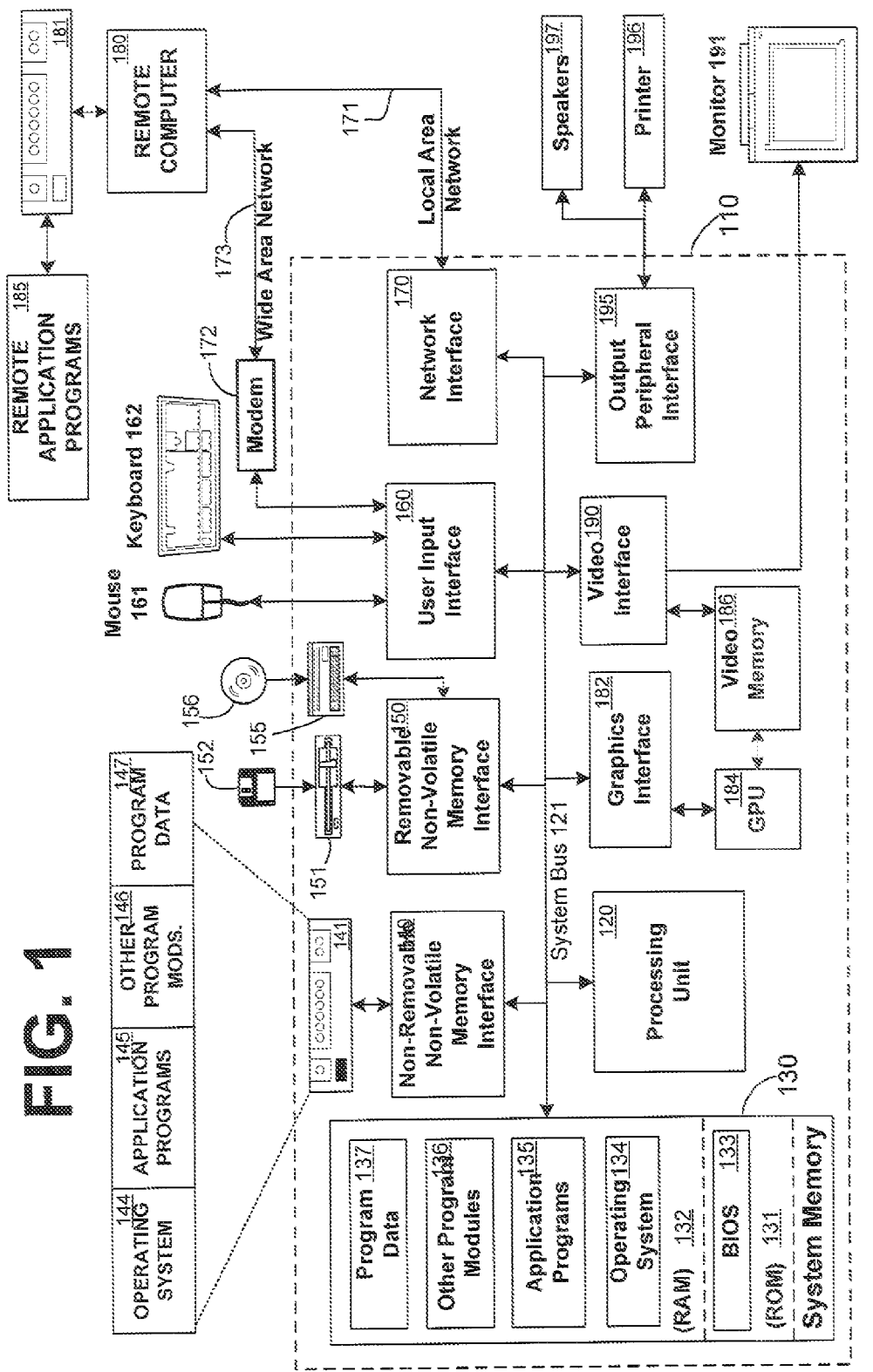
FIG. 1 is a block diagram illustrating an exemplary computing environment in which aspects of the invention may be implemented.

WAL (Write Ahead Logging) allows for an updated page to be written back to the location in which it was read (in-place updating) and is meant to guarantee that the log records representing the changes (or at least log records representing the ability to compensate or undo changes) are persisted to stable storage before the in-place updating is performed on the database. The transaction log can be thought of as a series of database page updates and provides a way to recover the database in the event of a program crash or other system outage event (such as power outage, kernel panic, or blue screen). When a log record for an update to a database page is persisted to stable storage, a reference to the database page the log record acts upon (and often a logical time sequence stamp of the page) is added to the log record. Then, if the database crashes, theoretically the database can be returned to a consistent state by reading the log records persisted to stable storage and checking to see if the update was made (by loading the indicated database page and comparing the record data or database page metadata to the log record data, or sometimes by comparing a timestamp in the log record with a timestamp on the database page). If the update was made, the next log record is read. If the update was not made, the change indicated in the log record is reapplied and the next log record is read. This process is sometimes called recovery. Recovery is complete when all the records in the log file persisted to stable storage have been checked against the database file, updates reapplied if necessary and any operations performed by unfinished (i.e., uncommitted) transactions have been undone or backed out. Thus after recovery, theoretically, the database will be in a consistent state, and will be up to date with the last committed transaction written. In order for recovery to work, the database must be in the correct physical state to begin with. Similarly, replaying incorrect log files may corrupt a database. Finally, if too many log records are lost, (perhaps because the database is operating on the premise that all committed transactions have been persisted on stable storage and that is not true) the recovered database may be corrupt or the database may be unrecoverable. For example, if any log records are lost, committed transactions may or may not be lost. If a log record relating to an update to a database page that has been persisted is lost, the database may be corrupt as the Atomicity and Consistency requirements of ACID transactions may have been broken.

Many hard drives including IDE-based drives cache IOs (input/output operations) such as disk writes (typically for performance reasons). Some of these types of drives support use of a Forced Unit Access flag so that use of the disk write cache can be avoided. Others do not have this feature and use of the disk write cache cannot be avoided. When a database system is run on a drive without the Forced Unit Access flag feature or on one that does not have the avoidance feature activated, the database update software may issue an IO to, for example, "write this log record to stable storage" and continue processing (such as writing a database page to persisted storage with that previously written logged data) assuming that the log record has actually been written to stable storage when actually the log record may have only been written into the disk write cache and has not actually been written to stable storage. If a power outage or other event prevents the disk write cache from being written to stable storage, the log record the software thought was safely persisted to stable storage is gone. As it is impossible to know when this type of hard drive actually persists the cached operations to stable storage, it is impossible to guarantee recoverability because some of the log records required to return the database to a consistent state may be gone.

It is also impossible to guarantee database consistency when drives that cache disk writes and do not have the Forced Unit Access flag feature or do not have it activated, are used for database operations on databases that rely on the premise that any completed write IO is guaranteed to be persisted to stable storage. Most modern databases rely on this premise because then the database engine can issue subsequent write IOs (write operation requests) knowing that the data in the previously completed IO has been applied to the persisted database. The problem arises because some drives that cache IOs consider the write IO to be completed when the data makes its way into the disk write cache, not when the disk write operation has actually written the data to stable storage. (That is, the disk drive does not support direct access to stable storage media.) This allows the database engine to issue subsequent IOs that can corrupt the database. To understand how this can happen, consider one possible scenario. Suppose for example, that a transaction that applies a series of updates to databases pages 1 and 15 is received. Database pages 1 and 15 are loaded into the database cache and the log records for the transaction, including a reference to the database pages they affect, are written into the log buffer in volatile storage. The updates are applied to the database pages in the database cache. When the COMMIT record is encountered, signaling that the last update belonging to the transaction has been reached, the commit processing is performed. If the commit processing completes successfully, a disk write IO is issued to write the log records for this series of updates from the log buffer to stable storage. Any time thereafter, the updated database pages can be written to stable storage. Suppose updated database page 15 is written to stable storage. Now suppose a power outage is experienced, and the log records representing the transaction were only in hard drive cache, and never actually made it to stable storage, while database page 15 did make it to stable storage. This would in effect, lose part the transaction relating to page 1, destroying the atomicity of the transaction and making the database inconsistent.

To address these problems, in accordance with embodiments of the invention, write operations for database pages stored in the database cache are not issued for some specified period of time or until some specified number of IO bytes have been written. In other embodiments of the invention, disk writes for log records are tracked and IOs for database pages stored in the database cache are not issued until a certain number of disk writes for log records have been issued. In other embodiments of the invention, the transaction log is segmented into generations of log files and write IOs to write database pages stored in the database cache to stable storage are not issued until a specified number of generations of log files between the log tip (the end of the log where incoming log records are added) and the log record corresponding to the database page update exist. In each embodiment, writing of database pages to stable storage is deferred according to some policy that is not, or is not solely, based on whether or not transactions are committed. This allows a set of committed transactions to be lost without destroying the integrity or consistency of the database even when the disk type used by the database system does not guarantee direct access to persistent storage. That is, a lose-able section of the log exists where log records in the lose-able section of the log can be lost and yet recovery to a consistent database can occur. In addition to tracking a checkpoint indicating a point in the log at which a database recovery operation should be initiated, a waypoint is tracked. The waypoint is a point in the transaction log following which corresponding updates to the database have not been applied to the database on stable storage. That is, the waypoint indicates a point after which log records can be lost and yet recovery to a consistent database can occur, maintaining all the elements of an ACID transactional system, except Durability. In some embodiments of the invention, similar logic is applied to checkpoint processing. For example, losing page writes/flushes performed as a result of checkpoint maintenance can adversely affect the database because the page writes may not have actually made it to stable storage (e.g., to disk). In some embodiments of the invention, a first traditional checkpoint is used to drive database IO to persistent storage and a second further deferred or delayed checkpoint is used to track where to begin recovery in the event of a system crash. Any of a number of policies can be used to determine the delay, as described above.

Replicating a database by making a copy of it and then applying the logged transactions to the database copy is called log shipping. When the database copy is initially set up, a "seeding" is typically done by copying over the original database from the active node (Node A) to the passive node (Node B) and then beginning to copy the transaction logs continuously and incrementally from Node A to Node B. If Node A fails, Node B becomes the active node. Because there is some delay in the process of copying transactions logs and applying them, Node B is likely to be somewhat out of date. (The two databases are said to be divergent.) That is, not all of the last updates applied to the database on Node A would be expected to have been made it over onto Node B's database so that the database on Node A right before it crashed is not likely to be exactly the same as the database on Node B. Replication can be re-established by copying over Node B's database back onto Node A. This is called a reseed or full reseed and is likely to be an expensive operation if the database is large, as it involves copying the entire database. A number of optimizations for re-establishing replication without copying the entire database are known. For example, only a subset of the database would have to be copied over if the blocks in the database that changed after a lossy failover could be identified. This is called traditional incremental reseed but known methods of traditional incremental reseed require the data in the database to be examined. Embodiments of the invention present a way to perform a new type of incremental reseed without analyzing the database data for divergent blocks. Instead, an incremental reseed in accordance with embodiments of the invention is based on a comparison of transaction logs rather than by comparison of database data and by tracking state (e.g., the waypoint) stored in the database headers. Examining the transaction logs and database headers will incur significantly less random IO than traditional incremental reseed.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with embodiments of the invention. While a general purpose computer is described below, this is but one example, and only a thin client having network server interoperability and interaction may be required. Thus, embodiments of the invention may be implemented in an environment of networked hosted services in which very little or minimal client resources are implicated, e.g., in a networked environment in which the client device serves merely as a browser or interface to the World Wide Web.

Embodiments of the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, mini-computers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, embodiments of the invention pertains to any computer system having any number of memory or storage units, and any number of applications and processes occurring across any number of storage units or volumes. Embodiments of the invention may apply to an environment with server computers and client computers deployed in a network environment, having remote or local storage. Embodiments of the invention may also apply to a standalone computing device, having programming language functionality, interpretation and execution capabilities.

Lost Log Resilience (Delaying Database Writes for Database Consistency)

A continuous set of committed transactions that have been applied to database pages stored in a database cache in memory can be lost without destroying the integrity of the database, by deferring the writing of the database pages stored in cache to the database on stable storage in accordance with a specified value representing a waypoint. In some embodiments of the invention, the transaction log is segmented into chunks of a specifiable size. A current log file is allocated and incoming transactions are logged by adding the log record for the transaction to the tail end or log tip of the current log file. When the current log file reaches the specified size, the current log file is renamed to a sequentially numbered log file. A new current log file is then allocated and the process repeats. When the new current log file reaches the specified size, the new current log file is renamed to an incremented sequentially numbered log file. This series of incremented sequentially numbered log files are called log file generations. In the example presented above, two generations of log files have been created. The database writes to stable storage may be delayed until a specified number of log file generations have been written to the log on stable storage. The specified number of log file generations that must exist before the updated database page(s) corresponding to the log record is flushed to disk may be referred to as "having a waypoint depth of [X]". In some embodiments of the invention, the log may be a continuous file where the waypoint and checkpoints are references to a point in the file. Alternatively, instead of basing a waypoint on a number of required log file generations, a waypoint may be set based on some specified period of time that must elapse from issuance of a disk write I/O for a log record or based on some specified number of disk write IO bytes that must be written to a disk write cache before corresponding disk writes for database pages are issued. A waypoint is not restricted to occurring on a log file boundary; it may point to a record within a log file. A waypoint may be implemented as an offset from the end of the current log file. (For example, a waypoint may be specified as a rounded up number of generations of log files from the tail end of a current log file.) The waypoint is tracked in addition to tracking a checkpoint indicating a point in the log at which a database recovery operation should be initiated. The waypoint thus represents a point in the transaction log following which all portions of the transactions have not been applied to the database on stable storage and therefore represents the last log file or record within a log file that is actually needed for recovery of a consistent database. In some embodiments of the invention, the current waypoint is stored in the header of the database and is incremented whenever a new log file is written (whenever a new log file generation is created.)

When log shipping is implemented and there is a failover of an active database on Node A to a passive database on Node B, the passive database becomes the active database. When all of the log files that existed on Node A are not on Node B, there is a lossy failover of the active database to the passive database, but the database on Node B is consistent. That is, although some of the updates applied to the Node A database will not have been applied to the database (or log) on Node B, those that have been applied to the database on Node B have left it in a consistent state by virtue of the Atomicity property of database transactional processing. A current log is started on Node B for the now-active database on Node B. Suppose for example that four generations of complete log files existed on Node A when it failed. Only three generations of log files may have been received by Node B. Hence when Node B starts a current log, it is starting its fourth generation log file. Thus, log generation numbers already used on Node A are used on Node B, but the content of these same-numbered generations of log files on the two nodes are not the same. Because transactions in log files on Node A have been applied to the database on Node A and have not been applied to the database on Node B, the content of the database on Node A is not the same as the contents of the database on Node B. Traditionally, a full reseed of the database on Node A (copy the entire database from Node B to Node A) would now be done to bring the divergent databases back into the same state. Alternatively, and as is known, the database pages referenced in the logs not applied to Node B could be compared in the database on Node A to those on Node B and if divergent, Node A could request Node B for the affected database pages, and replace the affected database pages on Node A with the corresponding pages from the database on Node B. This is a traditional incremental reseed. In accordance with embodiments of the invention, the existing post-waypoint log files on Node A are deleted and the post-waypoint log files are copied from Node B to Node A. At this point, normal log shipping resumes. That is, in accordance with embodiments of the invention, a log-based incremental reseed is performed by copying log files instead of by copying database pages, and is based on the comparison of log files instead of by examination of database pages. Alternatively, in accordance with other embodiments of the invention, on a database system with perfect UNDO characteristics whereby recovery can be run in reverse to produce a previous version of the database, this invention method could be extended to fixing divergence occurring in pre-waypoint log files. In such an implementation the pre-waypoint log files could be undone or backed out of the database, and then any divergent log files are copied from Node B to Node A to execute the incremental reseed and allow normal log shipping to resume. Great economies can be realized using log-based incremental reseeding because log files are simple sequential files and just a few log files will need to be copied. Thus, log files can selectively be replayed on the active database. A point at which divergence in the log files occurs is found by comparing log files starting from the most recent log file and working backwards. If divergence in the log files occurs after the waypoint, the databases are not divergent and the log-based incremental reseed is required only to correct divergence in the transaction logs of Node A and Node B. If the new active database has replicated logs up to the waypoint, the initially active database can perform a fast incremental reseed based on the logs instead of based on a comparison of the databases. In an alternative implementation, such could be accomplished by working on segments of the transaction log, rather than full generation based log files. In a database that does not maintain complete UNDO information, if the point of divergence in the log files occurs before the waypoint, some form of traditional reseed is needed.

Figure 2:
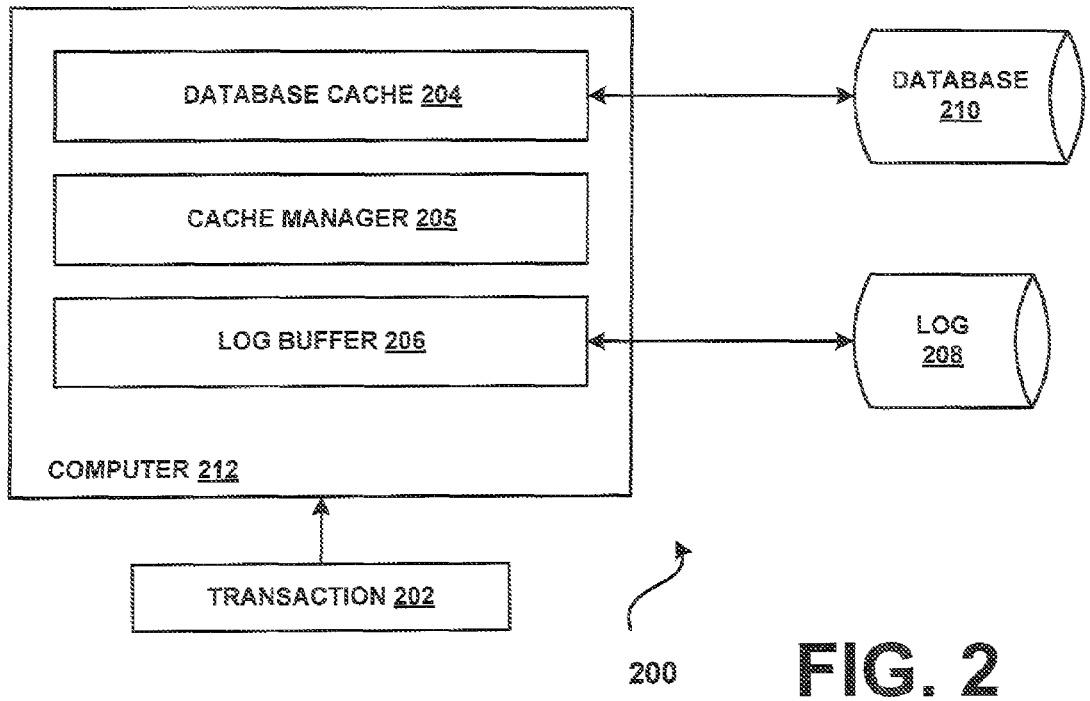
FIG. 2 is a block diagram of a system that delays database writes for database consistency in accordance with some embodiments of the invention.

FIG. 2 is a block diagram showing an example of a lost log resilient system 200 in accordance with some embodiments of the invention. The system may reside on one or more computers (e.g., computer 212) such as the one illustrated above with respect to FIG. 1. The system may include one of more of the following: transactions 202, a database cache 204 in volatile storage, a log buffer 206 in volatile storage, a cache manager 205, a database 210 on stable storage and a transaction log 208 on stable storage. A transaction, as described above, is an atomic unit of work; that is, all the operations in the transaction are done or none of them are done. An example of a transaction may be moving a mail message from one folder (an inbox, for example) to another folder (e.g., to a deleted mail folder). A single operation (move this mail message from folder 1 to folder 2) may be involved with a number of logical operations that in turn involve many low-level physical operations that must be performed on the database. For example, the operations necessary for the example transaction may include deleting the message from the source folder, inserting the message into the new folder and updating the folder sizes. Each of these operations may involve dozens of physical changes to the database.

Figure 3:
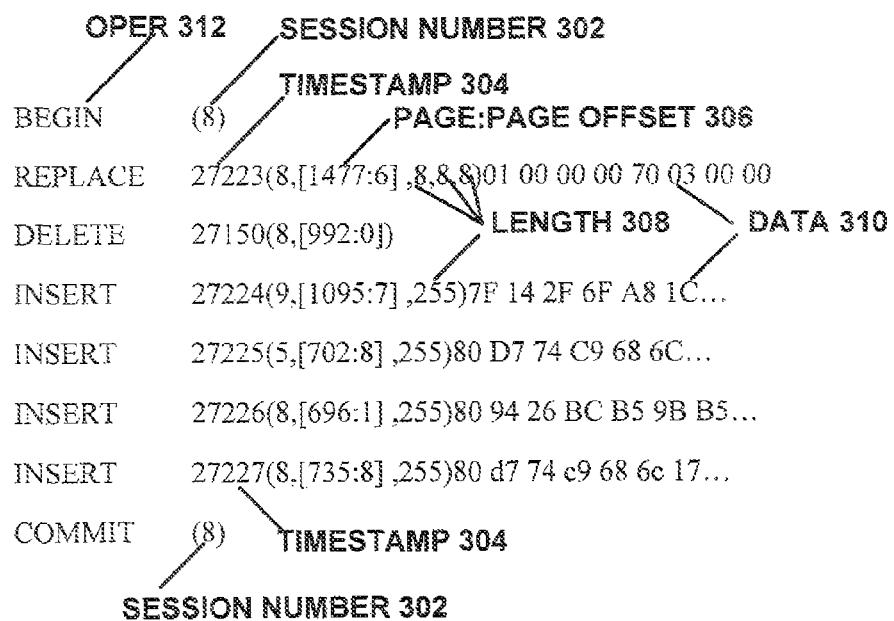
FIG. 3 is an example of a set of log records for a transaction in accordance with some embodiments of the invention.

The database page or pages of database 210 to be updated by the transaction 202 are loaded into volatile storage database cache 204. Logging is performed after the database page is modified in volatile storage and before the database page is persisted to stable storage (back to database 210). In accordance with some embodiments of the invention, a log record may be generated from each of the update records in the transaction and may include one or more of the following pieces of information: a session number, timestamp, page number, page offset, one or more length indicators and data as well as other information. A sample set of log records may look like the ones illustrated in FIG. 3 in which the first update record is "Begin (8)"

The type of operation 312 for this update record is "BEGIN"—that is, this record signals the beginning of a group of updates that comprise a transaction. The session number 302 is 8. The session number ties the different log records of the transaction together. For example, the log records beginning "27224(9," and "27225(5," are from different sessions (and thus from different transactions), specifically, log record 27224 is from session 9 and log record 27225 is from session 5. The second update record of this transaction is a REPLACE operation having the timestamp 304 of 27223, a page reference of 1477 and page offset of 6 in the format page:page offset 306, 3 length indicators 308 (8,8,8) and (binary) data 310 (01 00 00 00 70 03 00 00) and so on. The COMMIT record signals the end of transaction of session 8. Thus log records include transactional information such as begin and commit and provide a record of physical modifications to the database. In some embodiments of the invention, only post-images are logged, to reduce the size of log files. As described above, one logical operation may result in a number of physical modifications of the database. Operations performed by different transactions may be interleaved in some implementations; that is, any log file can include log records of different transactions mixed together.

Figure 4:
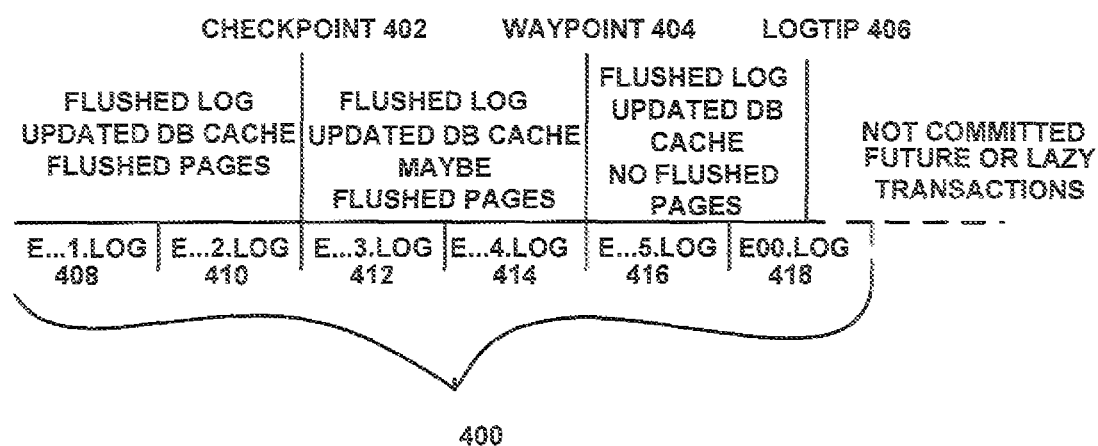
FIG. 4 is an example of a portion of a transaction log in accordance with embodiments of the invention.

In some embodiments of the invention, a log (e.g., log 208) is broken up into smaller segments as described above and is assigned a generation number, typically though not necessarily starting with generation one. FIG. 4 illustrates such a log. In FIG. 4, a log 400 is divided into segments comprising files E00001.log 408, E00002.log 410, E00003.log 412, E00004.log 414, E00005.log 416 and current log E00.log 418. Space may be allocated in volatile storage for the current log file (e.g., E00.log 418) and new transactions coming in may be written into the E00.log current log. New transactions are added to the tail end of the file. The point at which new transactions are added to the current log is called the tip of the log or logtip (e.g., logtip 406). When the allocated space is filled up, (E00.log 418 is full) the current log file is renamed, and is assigned a generation number. For example, in FIG. 4, when E00.log 418 is full it will be renamed to E00006.log because logically it is the log after E00005.log 416. A new E00.log is created and subsequent future transactions are written into current log, E00.log. When E00.log fills up again, E00.log is renamed to the next generation log file, E00007.log (not shown), and so on.

When the COMMIT record is encountered, signaling that the last update belonging to the transaction has been reached, the commit processing is performed. In traditional commit processing as known in the art, if the commit processing completes successfully, a disk write IO is issued to write the log records for this series of updates from the log buffer to stable storage and, as described above, in known systems, any time after the disk write IO is completed, the updated database pages can be written to stable storage. In contrast, in accordance with some embodiments of the invention, any updates relating to log records in log files after the waypoint 404 (e.g., E00005.log 416 and E00.log 418 in FIG. 4) are guaranteed not to have been persisted to the database on stable storage. Any particular record in the log 400 thus will not be flushed to the database until the log record has moved past the waypoint going from right to left (e.g., in FIG. 4, that means the database page corresponding to the log record will not be flushed until the log record is somewhere in E00001.log 408, E00002.log 410, E00003.log 412, or E00004.log 414). Hence any log records to the right of the waypoint can be lost without causing database inconsistency during recovery, although some committed transactions may be lost. Logs may be lost for many reasons including but not limited to the following: the CHKDSK utility may erase a log because it detects data corruption, an anti-virus program may erase a log thinking it is a virus, human error: an administrator or other user may erase a log in error, or log or logs may be lost because of the disk write cache problem described above.

Referring to FIG. 4 again, all the (committed) log records in log files E00001.log 408 and E00002.log 410 (prior to checkpoint 402) have been persisted to the log on stable storage and the database pages that these transactions have affected have been persisted to the database on stable storage, as evidenced by the location of checkpoint 402. A committed transaction is one for which the COMMIT record of the transaction has been flushed to the log. In other implementations instead of acting in whole log files, merely a reference to a point in the log stream is used. Thus log files E00001.log 408 and E00002.log 410 are not needed for recovery because all of the records in these files have been persisted to the log on stable storage (flushed log in FIG. 4), have been used to update the database cache (updated db cache in FIG. 4) and the updated database pages have been flushed to persistent storage (flushed pages in FIG. 4). All of the log records in log files E00003.log 412 and E00004.log 414 (between checkpoint 402 and waypoint 404) have been persisted to the log on stable storage (flushed log), have been used to update the database cache and some of the updated database pages have been flushed to persistent storage (denoted by maybe flushed page in FIG. 4). All of the log records in log files E00005.log and in the current log E00.log have been flushed to the log and correspond to transactions that have updated the database cache but the updated database pages in cache have not been flushed to the database on persistent storage. The updates not yet added to the log are referred to as not committed, future or lazy transactions. This means that E00001.log 408 and E00002.log 410 can be lost because these transactions have already been applied to the database on stable storage and E00005.log 416 and E00.log 418 can be lost because none of the database pages that these transactions have affected have been persisted to the database on stable storage. The only log files that would be needed to successfully run recovery for whatever reason in this scenario are E00003.log 412 and E00004.log 414. It will be appreciated that although FIG. 4 shows two generations of log files between the checkpoint 402 and the waypoint 404 and one complete log file between the waypoint 404 and the logtip 406, in implementations where a single transaction log file is maintained similar functionality is obtained by specifying segments of the transaction log as being under such behavior/control. It will be appreciated that although FIG. 4 shows two generations of log files between the checkpoint 402 and the waypoint 404 and one complete log file between the waypoint 404 and the logtip 406, any number of log file generations may be maintained between the checkpoint and the waypoint and between the waypoint and the logtip as specified by the waypoint. For example, a certain amount of time may be specified to elapse before updated database pages are persisted to stable storage or a certain number of disk writes for log files may be specified as required to be written before updated database pages are persisted to stable storage. A specified number of generations of log files to the right of the waypoint (as illustrated in FIG. 4) may be required to exist before corresponding database pages are allowed to be flushed.

Figure 5A:
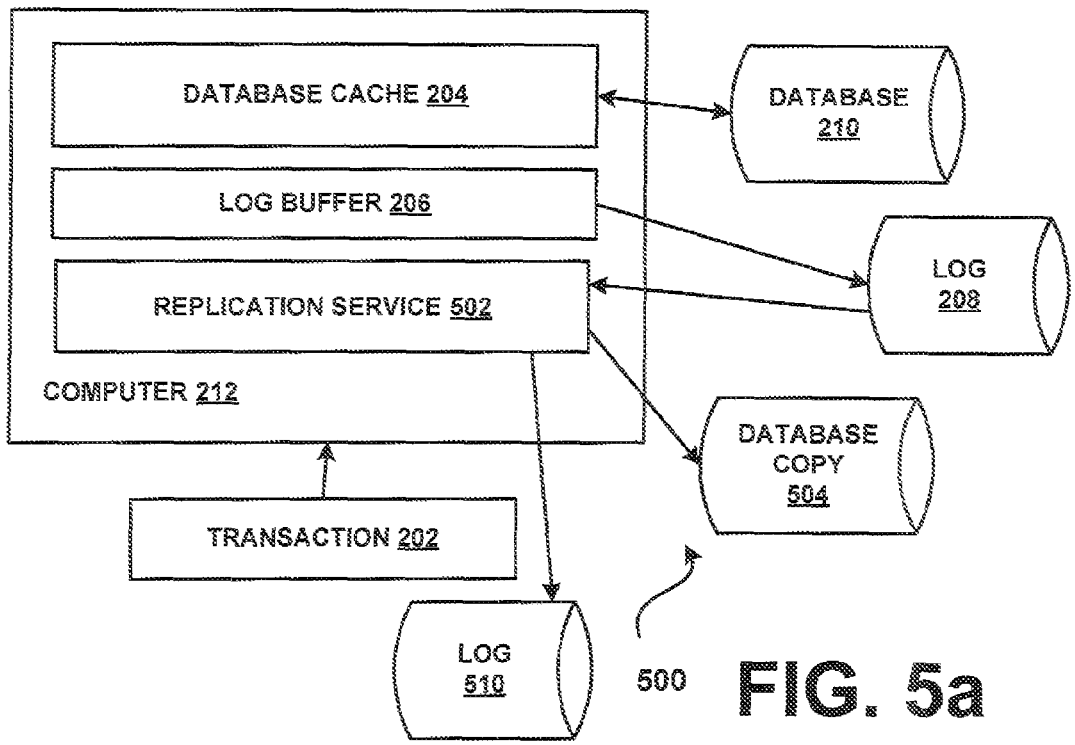
FIG. 5a is a block diagram of a mirrored database system running on a single computer in accordance with embodiments of the invention.
Figure 5B:
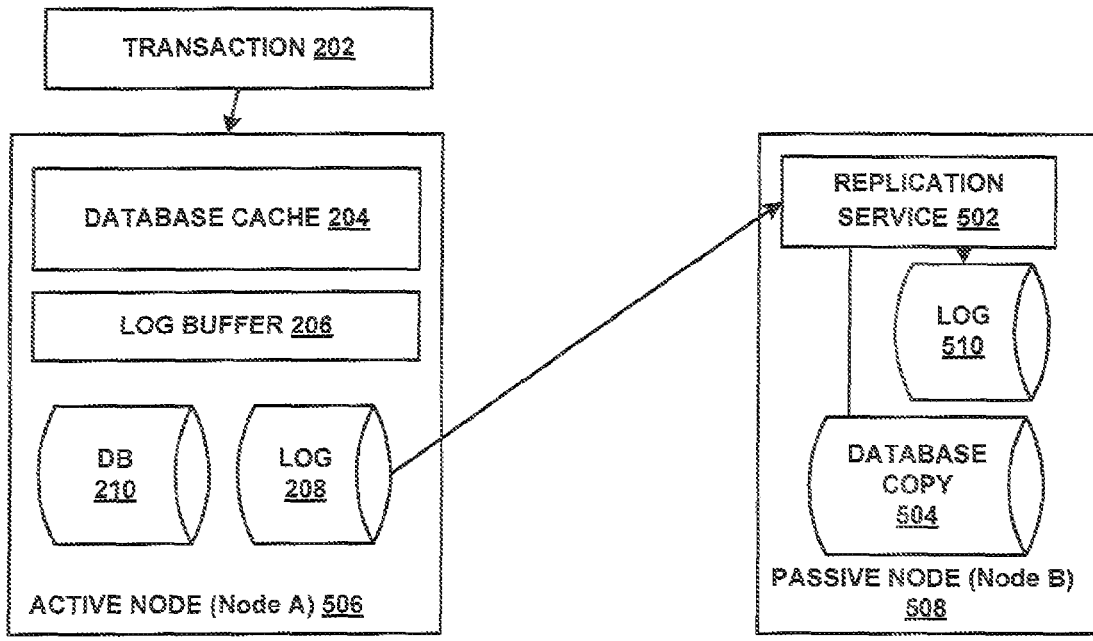
FIG. 5b is a block diagram of a mirrored database system running on two computers in accordance with embodiments of the invention.

FIGS. 5a and 5b illustrate other embodiments of lost log resilient systems. In FIG. 5a a system 500 such as the one described above with respect to FIG. 2 is shown except that replication service 502 and a copy of the database 504 reside on the same computer 212. (Database cache manager 205 is not shown in FIGS. 5a and 5b.) Transactions 202 that are applied to the database 210 are logged to log 208 and copied by replication service 502 to log 510. As the transactions are logged they are shipped to the log copy 510 and the replication service 502 applies the log files 510 to the copy of the database 504 using recovery procedures. Hence the replication service 502 keeps a copy of the database 504 up to date by copying the log files as they appear to replication log 510 and replaying the log records in the log files of log 510. In other implementations, the replication service 502 may keep a copy of the database 504 up to date by replaying the log records in the log files of log 208 on database copy 504. Thus, if database 210 (the active database) crashes or is corrupted, the copy of the database 504 can become the active database. In an alternative implementation, instead of implementing log shipping by copying chunks of log file, replicating transaction log data may be accomplished through some other inter-process communications (IPC) mechanism.

FIG. 5b shows another system in which instead of the copy of the database 504 residing on the same computer, the copy of the database 504 resides on a second computer. The active database 210 runs on one computer, the active node (Node A) 506 and the copy of the database 504 runs on a second computer, the passive node (Node B) 508. In an alternative implementation, instead of implementing log shipping by copying chunks of log file, replicating transaction log data may be accomplished through some other remote networking mechanism (such as RPC or TCP/IP).

In accordance with embodiments of the invention, when there is a lossy failover of the active database to the passive database, the passive database becomes the active database. If the new active database has replicated logs up to the waypoint (to the left of the waypoint as illustrated in FIG. 4), the initially active database can perform a fast incremental reseed based only upon copying back the logs following the waypoint (to the right of the waypoint as illustrated in FIG. 4) from the new active database.

Referring again to FIG. 5b, suppose that Node A 506 fails and a lossy failover to Node B 508 is performed. Suppose further that at the time of Node A's failure the state of the database 210 and log 208 is as represented in FIG. 4. Given these circumstances, the copy of the database 504 and log 510 of Node B 508 can be in one of the following states:

the database 504 (or log 510) on Node B 508 can be replicated to a point after the checkpoint 402 but preceding the waypoint 404;

the database 504 (or log 510) on Node B 508 can be replicated to the waypoint 404;

the database 504 (or log 510) on Node B 508 can be replicated past the waypoint 404.

If the database 504 (or log 510) on Node B 508 has been replicated to some point following the waypoint 404, a fast log-based incremental reseed according to embodiments of the invention can only be performed by removing log files E00005.log 412 and E00.log 414 because Node A 506 would not have applied any portion of the transactions in the log files after the waypoint 404 and Node B 508 would not have all of those log files. If Node B has replicated only through E00003.log to its log 510, a fast log-based incremental reseed according to embodiments of the invention can not be performed. For example, suppose the database 504 on Node B 508 has been replicated through E00003.log 412 but not through E00004.log 414. When Node B 508 becomes active, it would start generating a new log generation 4 that would differ from E00004.log 414 so that if Node B 508 merely shipped back the new E00004.log generated on Node B 508, the state of database 210 would be inconsistent because of the portion of E00004.log 414 transactions persisted to stable storage, as explained above. Because a portion of E00004.log 414 may have been applied to database 210 persisted to stable storage on Node A 506, and because Node B 508 would not have E00004.log 414, to accept a new version of log E00004.log 414 created on Node B, would result in two different sets of transaction logging being applied to Node A's 506 database 210, and thus would result in database corruption.

Database divergence refers to a condition in which the content of the database and the content of the copy of the database are different. A log file divergence refers to a condition in which the contents of log file generation X on the active node differs from the contents of the same-generation log file (log file generation X) on the passive node. Divergence in database or in log files can be caused by a lossy failover, by a "split-brain" operation on a cluster (because even if clients cannot connect to the database, background maintenance still modifies the database), by administrator error (by for example, running recovery incorrectly). In some embodiments of the invention, the replication service 502 detects divergence. Divergence is detected by comparing the last log file on the currently passive node copy to the same-generation log file on the currently active node.

If the database 504 on Node B 508 has been replicated to the waypoint 404, (through E00004.log 414) a fast log-based incremental reseed could be performed because doing so would result in a consistent database, although some committed transactions are likely to have been lost. For example, suppose the database 504 on Node B 508 has been replicated through E00004.log 414 when Node A 506 fails. Node B 508 becomes the active node and Node A 506 becomes the passive node. Database copy 504 becomes the active database and database 210 becomes the database copy. Now passive Node A 506 detects when coming up that it has lost the active role and asks now-active Node B 508 for the state of the logs. By comparing the log files 208 of Node A 506 to the log files 510 of Node B 508 (no database comparison is needed) it is determined that Node A 506 can perform the fast incremental reseed by removing the log files following the waypoint 404 (E00005.log 416 and the current log 418) on Node A 506 and copying the logs following the waypoint on now active Node B 508 (E00005.log and the current log) from now active Node B 508 to now passive Node A 506 before Node A 506 starts the regular log shipping recovery process. It will be appreciated that E00005.log and the current log on Node B contain different data from that in E00005.log 416 and the current log 418 on Node A.

If the database 504 on Node B 508 has been replicated past the waypoint 404 by one or more complete log files, a fast log-based incremental reseed can be performed because doing so results in a consistent database, although some committed transactions may have been lost. For example, suppose the database 504 on Node B 508 has been replicated through E00005.log 416 when Node A 506 fails. Node B 508 becomes the active node, Node A 506 becomes the passive node, database copy 504 becomes the active database and database 210 becomes the database copy. Now-passive Node A 506 detects when coming up that it has lost the active role and asks now-active Node B 508 for the state of the logs 510. By comparing the log files 208 of Node A 506 to the log files 510 of Node B 508 (no database comparison is needed) it is determined that Node A 506 can perform the fast incremental reseed by removing the log files past the waypoint 404 that have diverged (i.e., the current log/E00.log 418) and copying the logs following this point on now active Node B 508 (log E00005.log or the current log if E00005.log does not exist) from now active Node B 508 to now passive Node A 506 before Node A 506 starts the regular log shipping recovery process.

Figure 6:
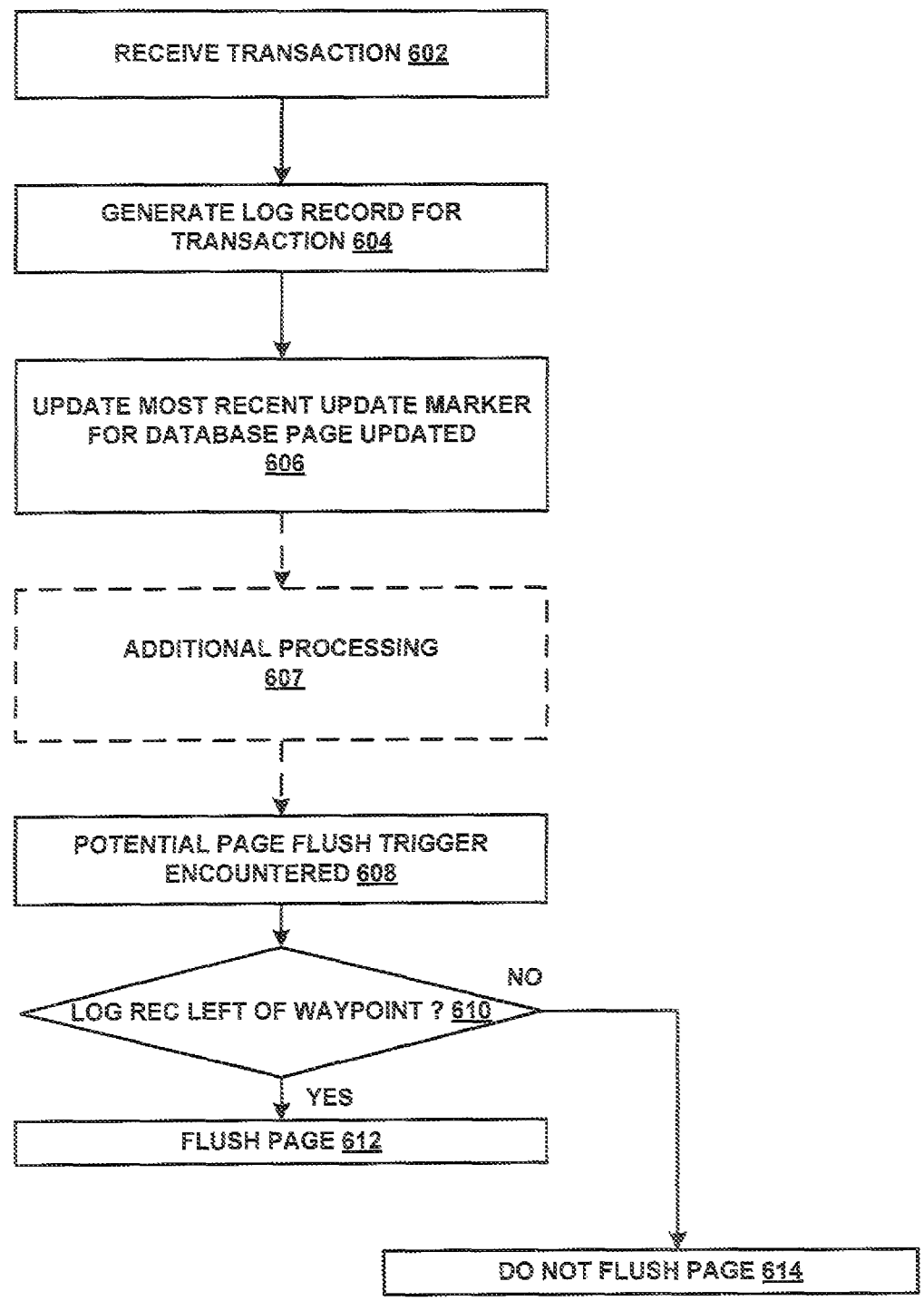
FIG. 6 is an example of a method for deferring database page writes in accordance with embodiments of the invention.

FIG. 6 illustrates a process for deferring page writes in accordance with embodiments of the invention. At 602 a transaction is processed. Suppose for example, the transaction record being processed updates database page 1. At 604 a log record is written that logs the transaction record. The log record also includes the database page touched by the transaction record. For example the log record corresponding to the transaction record that updated database page 1 would include a reference to the modified database page. At 606, the buffer manager maintains in memory the location in the log file of the most recent update to the database page updated. For example, the location in memory for database page 1 would be updated to indicate the position in the log at which the most recent update (this one) to database page 1 is logged. In some embodiments of the invention, the log position includes a three-part number indicating a log generation number, a sector and a byte offset of the log record in the indicated log generation file. From this information the location of the log record corresponding to the most recent update to the database page can be determined. It will be appreciated that while this is one possible way to determine the log position of the log record corresponding to the most recent update to the database page, the invention as contemplated is not so limited and any way to locate the log record corresponding to the most recent update may be used. Processing continues (607). At 608, a trigger to attempt to flush the page is encountered. Page flush reasons (such as for checkpoint maintenance, available page pool maintenance, idle flush or cache shrinkage) are well-known in the art and are not further discussed herein. At 610, the location of the log record corresponding to the most recent update for that page is compared to the waypoint. As described above, the waypoint may be calculated or set in numerous ways. At 612 if the log record corresponding to the most recent update to the database page is left of the waypoint (as illustrated in FIG. 4) the database page is flushed to disk. If the log record corresponding to the most recent update to the database page is right of the waypoint (as illustrated in FIG. 4) the database page is not flushed to disk. In some embodiments of the invention, if a page is continuously being updated, a copy or second version of the page is made. The newer version of the page is then allowed to be updated and the older version of the page is not allowed to be modified so that when the most recent update to the older page has moved to the left of the waypoint, the older version of the database page can be flushed to disk.

Figure 7:
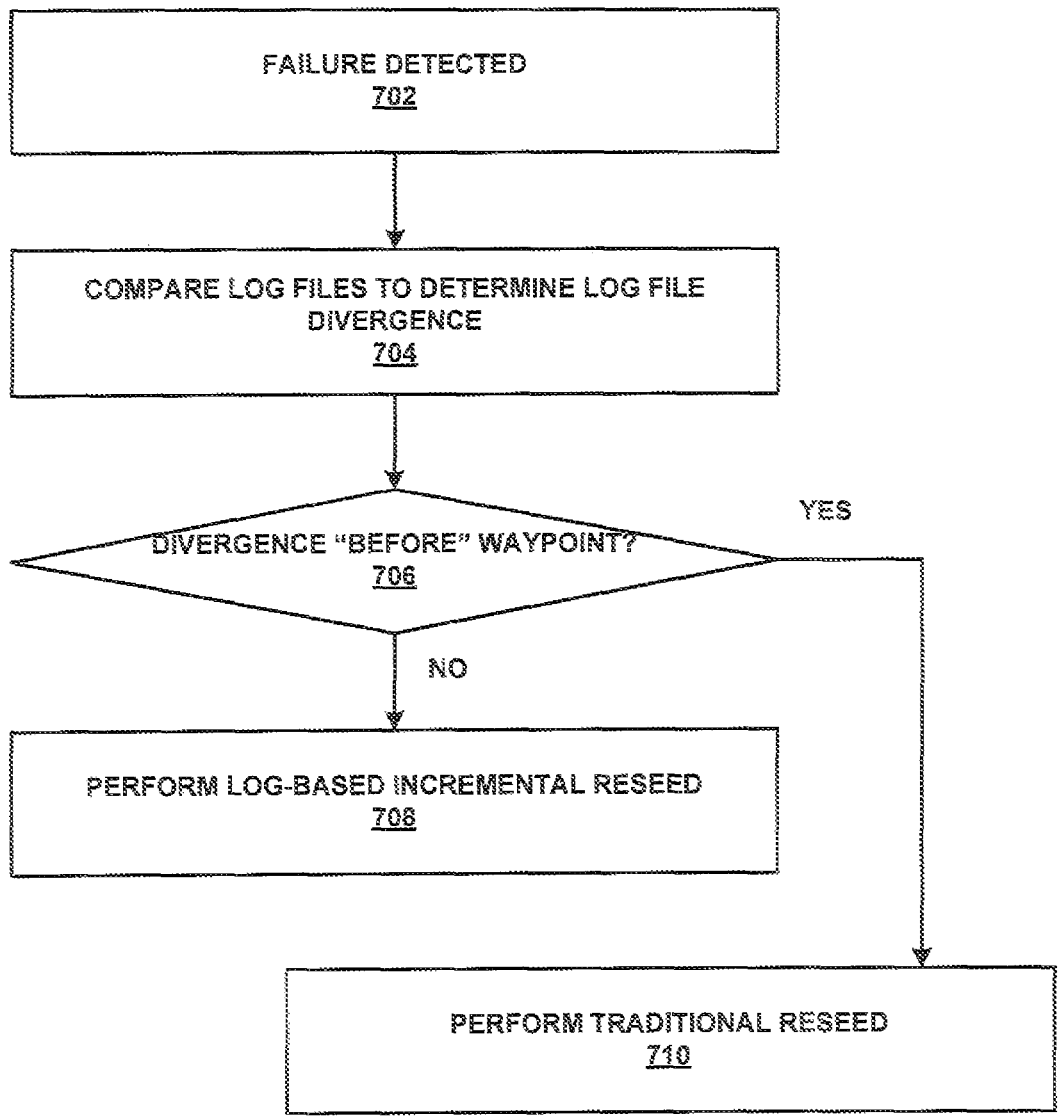
FIG. 7 is an example of a method for log-based incremental reseed in accordance with embodiments of the invention.

FIG. 7 illustrates a method for log-based incremental re-seeding in accordance with embodiments of the invention. It will be understood that some of the following acts may be optional. At 702 failure is detected. At 704 the point of divergence of log files on Node A and Node B is determined by comparing log files starting from the most recent log file and moving backwards. At 706 if the point of divergence in the log files occurs before the waypoint, (in log files E0001.log 408, E00002.log 410, E00003.log 412 or E00004.log 414) traditional reseed/incremental reseed procedures are needed (710). At 708 if the point of divergence in the log files occurs after the waypoint, (in log files E0005.log 416, or in current log E00.log 418), a log-based fast incremental reseed as described above can be performed, resulting in a consistent database.

The various techniques described herein may be implemented in connection with hardware or software or, where appropriate, with a combination of both. Thus, the methods and apparatus of embodiments of the invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of embodiments of the invention, e.g. through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While embodiments of the invention have been described in connection with the figures, it is to be understood that other similar embodiments may be used or modifications and additions may be made to the described embodiments for performing the same functions without deviating there from. Therefore, the invention should not be limited to any single embodiment, but rather should be construed in breadth and scope in accordance with the appended claims.

What is claimed:

1. A method of deferring page flushes comprising:
   establishing a waypoint for a database, wherein the waypoint is associated with a point in a transaction log after which no portion of transactions on the database have been applied to the database on stable storage, wherein the waypoint is set according to a policy, wherein the policy is not based on transactions being committed to the transaction log; and
   deferring issuance of a disk write operation for an updated database page in memory until a log record is written to the transaction log corresponding to a most recent page update for the updated database page in the database and said log record is located at a point in the transaction log past the waypoint;
   incrementing a first checkpoint forward in the log file wherein the checkpoint indicates writes to database page and represents a location in a log file in which a database recovery operation should initiate.

2. The method of claim 1, wherein the transaction log is segmented into a series of log files, wherein each log file of the series is associated with a sequential incremented generation value, wherein incoming transactions are logged at a logtip comprising an end of a current transaction file comprising a most recently created log file.

3. The method of claim 1, further comprising determining that the log record corresponding to the database page update is located at a point in the transaction log past the waypoint and in response, allowing write operation requests to be issued for the updated database page.

4. The method of claim 1, wherein the waypoint is based on a number of write operation requests issued to the database since the log record corresponding to the database page update was flushed to a persisted transaction log.

5. The method of claim 1, further comprising determining that the log record corresponding to the database page update is located at a point in the transaction log past the waypoint and determining that the database page is not referenced in a more recent update and in response, issuing the write operation request for the database page.

6. The method of claim 1, wherein the waypoint is based on a period of time elapsing from a point in time at which the log record corresponding to the database page update was flushed to a persisted transaction log.

7. The method of claim 1, wherein the updated database page in memory comprises a first copy and a second copy of the database page is made in memory, wherein no further changes are made to the first copy after the second copy is made and wherein further changes are made to the second copy, wherein the waypoint associated with the database of the first copy is the waypoint associated with the database of the second copy.

8. The method of claim 1, wherein a checkpoint update comprising moving the first checkpoint forward in the log file.

9. The method of claim 8, wherein the deferral policy comprises a specified time interval from a most recent previous checkpoint update.

10. The method of claim 8, wherein the checkpoint update is deferred based on a policy comprising a specified number of bytes of data written to a disk IO cache.

11. The method of claim 8, wherein the checkpoint update is deferred based on a policy comprising a specified number of write operations.

12. A system comprising:
    a memory device comprising instructions that upon execution on a computing device instantiate at least:
    a cache manager that defers issuance of a write operation for a database page in volatile storage to a first database in stable storage based on a waypoint associated with the first database, wherein a transaction log associated with the first database is segmented into a current log and a series of generations of log files, wherein an incoming update to the database page is logged to the transaction log by adding a log record corresponding to the incoming update at an end of the current log and wherein the write operation is not issued until the offset from the end of the current log to a position of the log record in a segment of the transaction log is greater than the offset from the end of the current log to a position of the waypoint, and wherein the waypoint is associated with a point in a transaction log after which no portion of transactions on the database have been applied to the database on stable storage;
    a replication service that determines that the first database and a second database comprising a replicated copy of the first database, are not divergent based on a comparison of a segment of a replication log of the second database with a same-generation log file of the transaction log of the first database, wherein the replication service copies segments of a transaction log of the second database to a replication log of the first database and replays the replication log of the first database against the first database to generate a copy of the second database and wherein the replication service determines that the first database and the second database are not divergent by determining that a first divergence between the transaction log of the second database and the replication log of the first database is located at a position in the transaction log of the first database whose offset from an end of the transaction log of the first database is greater than an offset of the end of the transaction log of the first database to the waypoint.

13. The system of claim 12, wherein the first database and the second database reside on a same computer.

14. The system of claim 12, wherein the first database resides on a first computer and the second database resides on a different second computer.

15. The system of claim 12, further comprising a disk drive on which the first database is stably stored, wherein the disk drive does not support direct access to stable storage.

16. The system of claim 12, wherein the waypoint is based on a specified period of time that must elapse from issuance of a disk write operation for a log record.

17. The system of claim 12, wherein the waypoint is based on a specified number of bytes of data that must be written to a disk write cache before a disk write operation is issued.

18. A computer-readable storage medium comprising computer readable instructions that upon execution by a processor cause a system to at least:
    defer issuance of a write operation for a database page in volatile storage to a first database in stable storage based on a waypoint depth of a specified number of generations of log files required between a point at a tail end of a transaction log, wherein the transaction log is segmented into a current log and a series of generations of log files, wherein the write operation is not issued until the number of generations of log files between a logged update and the tail end of the transaction log exceeds the waypoint depth, and wherein the waypoint is associated with a point in a transaction log after which no portion of transactions on the database have been applied to the database on stable storage;

upon failure of the first database, determine that the first database and a second database comprising a replicated copy of the first database, are not divergent by determining that a first divergence between the transaction log and the replication log is located in a generation of log files preceding the waypoint depth.

19. The computer-readable storage medium of claim 18, comprising further computer-readable instructions for:

deleting log files of a generation exceeding the waypoint depth and replacing the deleted log files with same-generation replication files.

20. The method of claim 1, comprising incrementing the waypoint when a new log file generation is created; and issuing of a disk write operation for an updated database page in memory when the waypoint reaches a predetermined value.

* * * * *